United States Patent [19]
Wise

[11] Patent Number: 5,971,635
[45] Date of Patent: Oct. 26, 1999

[54] PIANO-STYLE KEYBOARD ATTACHMENT FOR COMPUTER KEYBOARD

[75] Inventor: Herbert H. Wise, Los Angeles, Calif.

[73] Assignee: Music Sales Corporation, New York, N.Y.

[21] Appl. No.: 09/075,988

[22] Filed: May 11, 1998

[51] Int. Cl.[6] .................................................... G10C 3/12
[52] U.S. Cl. ........................... 400/473; 400/82; 84/425; 84/744
[58] Field of Search ............................... 84/425, 743, 744, 84/745, 423 R, 423 B, 718, 719, 720; 400/713, 714, 472, 473, 82

[56] References Cited

U.S. PATENT DOCUMENTS

| | | | |
|---|---|---|---|
| 4,158,130 | 6/1979 | Speraw et al. ........................... | 400/473 |
| 4,297,044 | 10/1981 | Hornberg et al. ....................... | 400/473 |
| 4,352,313 | 10/1982 | Ny ............................................. | 84/425 |
| 4,704,940 | 11/1987 | Cummings ............................. | 84/423 R |

*Primary Examiner*—Edgar Burr
*Assistant Examiner*—Leslie J. Grohusky
*Attorney, Agent, or Firm*—Mitchell, Silberberg & Knupp LLP

[57] ABSTRACT

The present invention is a piano-style attachment apparatus for a computer keyboard comprising a base, a plurality of piano-styled keys hinged to said base, and anchors for anchoring the apparatus over the computer keyboard. Each piano-styled key has a protrusion extending downwardly for striking a corresponding computer key. The anchors comprise walls which extend deep in between computer keys in order to secure the apparatus to the computer keyboard.

9 Claims, 3 Drawing Sheets

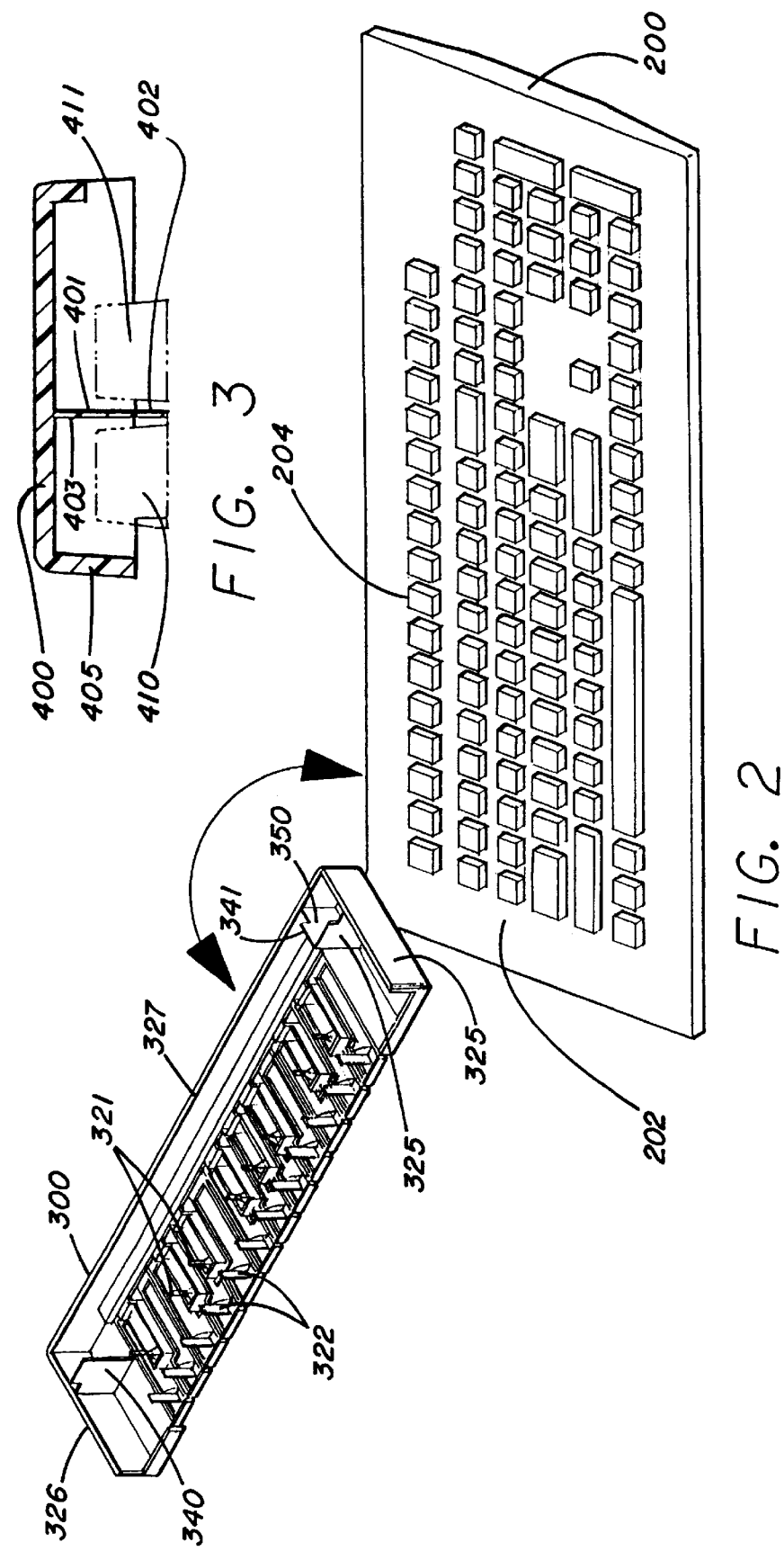

PIANO-STYLE KEYBOARD ATTACHMENT FOR COMPUTER KEYBOARD

BACKGROUND OF THE INVENTION

1. Field of Invention

This invention relates to the generation of music via computer. Specifically, it relates to specialized piano style keyboard attachments for computer keyboards.

2. Description of Related Art

A musical instrument generally comprises a plurality of note playing means. The most common note playing means are keys (such as the keys of a piano). Keyboard musical instruments come in all shapes and sizes and produce sound in many different ways. Well known keyboard instruments include pianos (electric and non-electric), organs, harpsichords, spinets, clavichords, synthesizers and accordions. Reference is made to FIG. 1, which shows part of a conventional piano keyboard. The keyboard has white keys and black keys. Each key, when pressed, produces a corresponding tone. The white keys correspond to what are commonly known as diatonic tones or notes and the black keys correspond to what are commonly known as chromatic tones or notes.

With respect to FIG. 1, the white keys include a C key 1, a D key 2, an E key 3, an F key 4, a G key 5, an A key 6 and a B key 7. The black keys include a C#/D♭ key 8, a D#/E♭ key 9, an F#/G♭ key 10, a G#/A♭ key 11, and an A#/B♭ key 12. Piano keys numbered on FIG. 1 as 1 through 12 constitute an octave.

Also shown in FIG. 1 is a second and higher octave. This second octave includes a C key 21, a D key 22, an E key 23, an F key 24, a G key 25, an A key 26 and a B key 27. The black keys included in the second octave are a C#/D♭ key 28, a D#/E♭ key 29, an F#/G♭ key 30, a G#/A♭ key 31, and an A#/B♭ 32. C key 1, for example, is one octave lower than C key 21.

It is important to distinguish the meanings of "note" and "pitch." The C key 1 and the C key 21 play the same "note." However, the same two piano keys play tones with different "pitches" because the two keys are an octave apart.

Furthermore, "half-step" means one tone higher or lower. For example, the B key 7 is a half-step lower than the C key 21. The D#/E♭ key is one half-step higher than the D key. A "whole step" constitutes two consecutive half steps. For example, the C key 1 is one whole step lower than the D key 2, because the C#/D♭ key 8 is between said C and D keys.

For purposes of the claims herein, the term "key" is intended to broadly mean all types of keys including conventional piano keys, buttons and other actuation devices. The term "conventional piano key" means conventional piano keys generally of the shapes shown in FIG. 1. Key 1 is a "conventional C piano key." It is rectangular with a divot on the upper, right side in order to accommodate placement of the C#/D♭ key 8. Key 2 is a "conventional D piano key." It is rectangular with a first divot on the upper left side to accommodate placement of the C#/D♭ key 8 and a second divot on the upper right side to accommodate placement of the D#/E♭ key 9. Key 9 is a "conventional D#/E♭ piano key." It is rectangular, shorter than each conventional diatonic piano key, and narrower than the lower portion of each such diatonic key.

At the same time, personal computer systems are well known in the art. Personal computer systems in general have attained widespread use for providing computer power to many segments of today's modem society. Personal computers generally comprise a system having a single central processing unit (CPU) and associated volatile and non-volatile memory, including all RAM and BIOS ROM, a system monitor, a keyboard, one or more flexible diskette drives, a CD-ROM drive, a fixed disk storage drive (also known as a "hard drive"), a "mouse" pointing device, a sound card, audio speakers and an optional printer. One of the distinguishing characteristics of these systems is the use of a motherboard or system planar to electrically connect these components together. These systems are designed primarily to give independent computing power to a single user and are inexpensively priced for purchase by individuals or small businesses.

Personal computer systems are typically used to run software to perform many diverse activities, one of which is the generation and playback of music or other sound. Through the introduction of digital signal processors, multimedia, and fast microprocessors, personal computer systems have brought to the consumer a level of sound realism only achievable in the past by specially designed music systems.

Conventional computer systems usually require the purchase of a specialty input device to allow the user to experience a degree of reality in playing a musical instrument. One such input device is an digital piano style keyboard capable of being interfaced to a personal computer system. Such a device has the advantages of providing the user with the feel and physical layout of a real musical instrument, such as a piano, organ, music synthesizer, or other keyboard instrument. The digital piano style keyboard, however, suffers from several disadvantages: they are expensive, they are often large and require extra space that is additional to the computer system itself and thus lack portability, the computer system may not be configured with the proper hardware to allow the addition of a digital piano style keyboard, and the user is usually burdened with the inconvenience of a complex installation.

Other attempts have focused on associating specific chords and melody notes with specific alpha-numeric keys on the computer keyboard. These attempts have eliminated the inconvenience of having to fasten and unfasten a piano style keyboard attachment to the computer keyboard, but have in the same process also deprived the user of the experience of using the conventional piano style keyboard because the user must associate specific alpha-numeric keys with specific melody notes in a layout which is totally different from a conventional piano keyboard or other keyboards.

It is therefore desirable to provide a piano-style keyboard attachment for a computer keyboard that can be secured easily over a conventional computer keyboard.

SUMMARY OF INVENTION

Accordingly, the present invention is a piano-style attachment apparatus for a computer keyboard comprising a base, a plurality of piano-styled keys hinged to said base, and anchors for anchoring the apparatus over the computer keyboard. Each piano-styled key has a protrusion extending downwardly for striking a corresponding computer key. The anchors comprise walls which extend deep in between computer keys in order to secure the apparatus to the computer keyboard.

These and other aspects, features, and advantages of the present invention will be apparent to those persons having ordinary skill in the art to which the present invention relates from the foregoing description and the accompanying drawings.

BRIEF DESCRIPTION OF THE DRAWINGS

FIG. 2 shows a typical computer keyboard 200 and the piano-style attachment of the present invention.

FIG. 3 illustrates how the anchors secure the device to the computer keyboard.

DETAILED DESCRIPTION OF THE PREFERRED EMBODIMENTS

Figure 1:
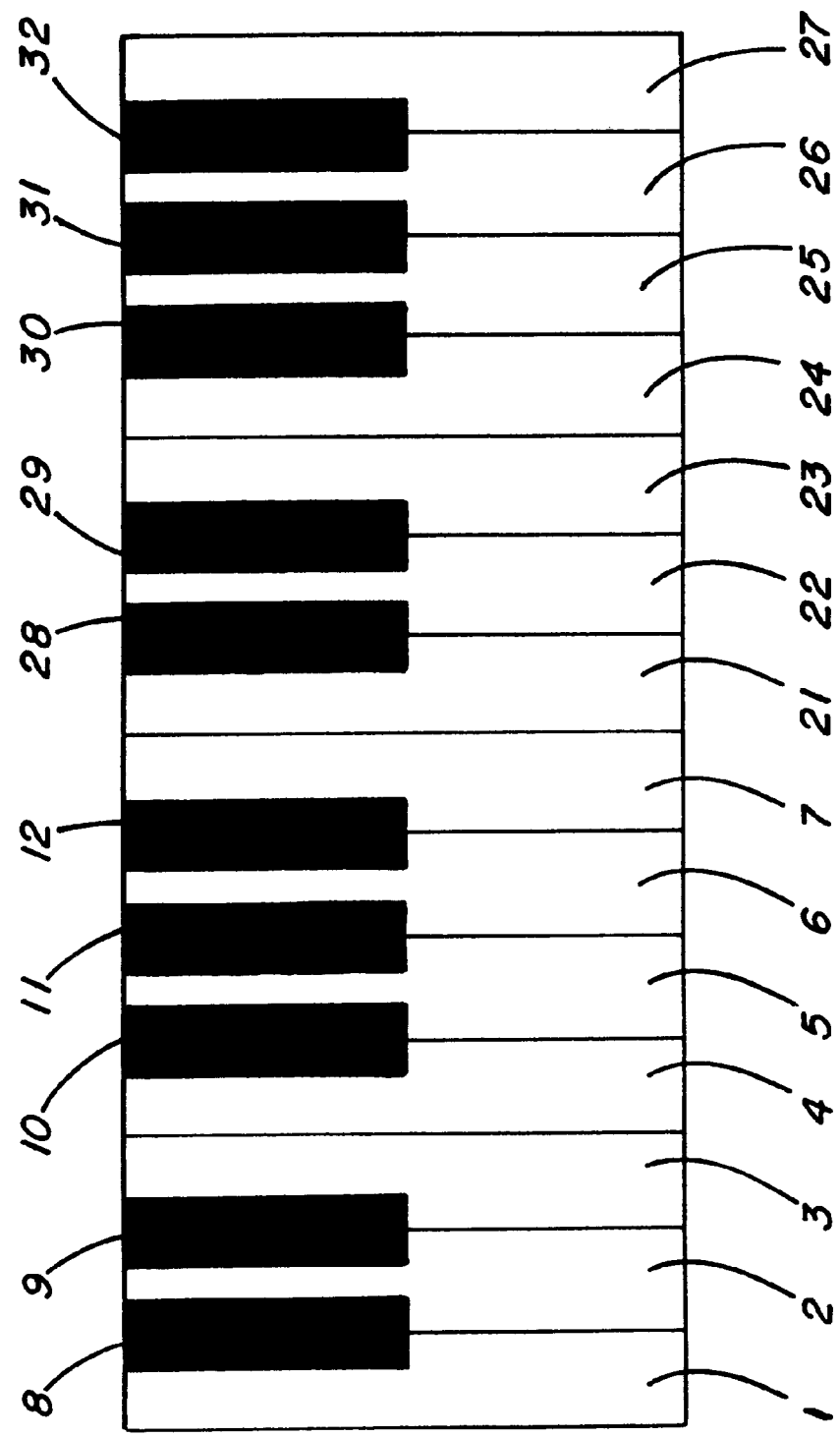
FIG. 1 shows part of a conventional piano keyboard.

Before describing the details of the present invention, a description of a typical computer keyboard is helpful in understanding the advantages of the present invention. Reference is had, therefore, to FIG. 2, which shows a typical computer keyboard 200. The typical computer keyboard 200 has a standard "QWERTY" alpha-numeric keyboard arrangement, indicated generally at 202, and a function key row, indicated generally at 204 (the term "QWERTY" is derived from the keyboard layout in which the first six keys in the first row of letters are "Q", "W", "E", "R", "T", and "Y").

The typical "QWERTY" alpha-numeric keyboard arrangement 202 is very well known in the art and contains other textual symbol keys commonly used in the input of textual information into computer systems. Through such a standard arrangement, a user may go from one computer system to another and input textual information in a relatively easy and efficient manner. The alpha-numeric keys in most computer keyboards are arranged in a manner identical to the arrangement of these keys in conventional typewriters. Arrangement of the function keys is not so standard and may vary in different keyboards. Moreover, such a standard arrangement of alpha-numeric keys is essential to touch typists who have mastered the standard "QWERTY" keyboard arrangement. However, it is to be understood that other standard, but less used keyboard arrangements of the alpha-numeric keys are available. For example, the so called "AZERTY" and Dvorak keyboards arrange the letters and certain symbols differently while maintaining the locations of the number row of keys. Furthermore, keyboards with other standard or non-standard alpha-numeric key arrangements, such as Greek, Russian, Hebrew, Arabic, Sanskrit, Japanese (including Katakana, Hiragana, Kanji), Chinese, Indian, etc. which have a top number row are applicable to the present invention.

The function key row, indicated at 204, is also well known in the art. The function key row generally includes a plurality of function keys and other general purpose keys, such as an "Escape" key or a "Pause" key. The function keys are general purpose keys whose "function" is defined by a particular software program running on the computer system. Thus, one software program may define the function keys to perform certain functions and a second software program may define the same function keys to perform other functions. In this manner, the function keys allow a user to access certain software functions quickly and efficiently by assigning the most commonly used functions to the function keys.

Although the function key row 204 is generally positioned above the standard "QWERTY" alpha-numeric key arrangement 202, such positioning is not standard in the art, nor are the number of functions keys that are available. The positioning and number of function keys is generally dependent on the available space on the computer keyboard and a keyboard designer's general intended use of the keyboard.

While the typical computer keyboard shown at 200 is suitable for most software applications, it is not particularly well suited for musical software applications. Traditionally, music is generated or composed most easily on a piano style keyboard. The layout of keys on a piano style keyboard is well known in the art of music and indicated in FIG. 1.

The standard "QWERTY" alpha-numeric key arrangement 202 and the common function key arrangement 204 make it difficult to input musical information which is related to a piano style keyboard because the keys are not grouped as in the traditional piano style keyboard arrangement. Thus, one may learn to "play" a piano on the typical computer keyboard 200 and then experience difficulty when attempting to play a real piano.

Under the present invention, a piano-like keyboard is secured over the typical computer keyboard 200 such that it emulates the physical appearance and key arrangement of a piano style keyboard while retaining the standard "QWERTY" or other alpha-numeric key arrangement.

Figure 4:
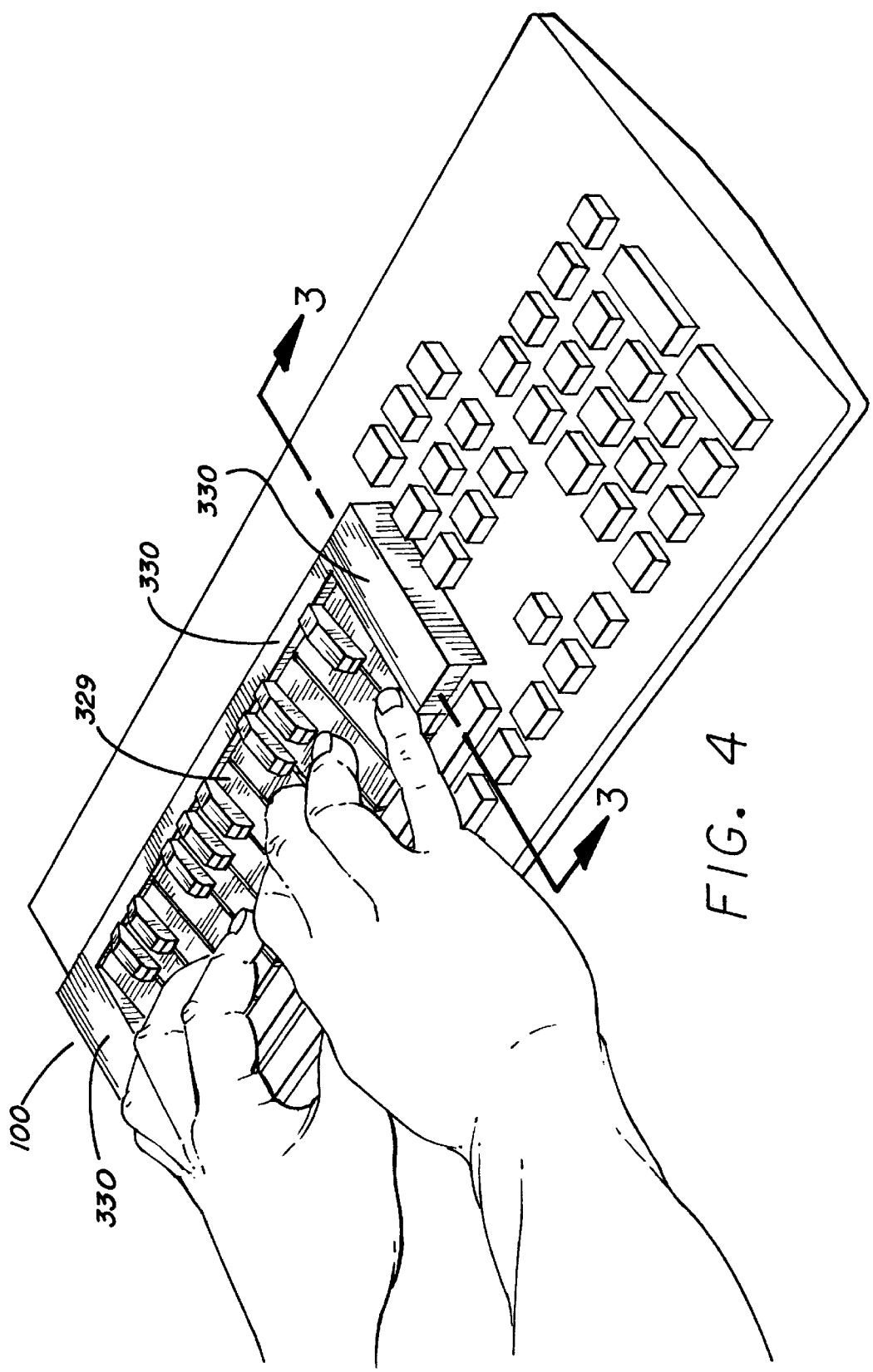
FIG. 4 illustrates the top surface of the present invention.

FIG. 4 illustrates the top surface of the present invention, a piano-style keyboard attachment 100 for a standard computer keyboard. Shown are a plurality of conventional piano keys 329, each of which is hinged to a base 330. Each key corresponds to a specific note on a piano keyboard. For example, the leftmost key is a C key and the rightmost key is a G key in the next, higher octave. Preferably, the keys include white diatonic keys and black chromatic keys. Typically, the present invention will comprise plastic.

The attachment performs its intended function by being placed over the conventional computer keyboard illustrated in FIG. 4. Typically, the attachment will not be placed over the function key arrangement. By pressing one of the hinged conventional piano keys on the attachment, the conventional piano key presses down a corresponding computer keyboard key. Said computer key activates the specific note corresponding to the conventional piano key played via the computer.

FIG. 2 illustrates the piano-style key attachment 300 from the bottom side. Again, the keys 329 are shown, only from the bottom-side up. Each chromatic key has a downwardly directed protrusion 321. The function of each such protrusion is to press down the chromatic key's corresponding computer keyboard key. Similarly, each diatonic key has a protrusion 322 for the same purpose, although each such protrusion is slightly off-center with respect to its respective diatonic key. Table I below sets forth which conventional piano keys correspond to which computer keys.

TABLE 1

| Computer Key | Key Note |
|---|---|
| A | C |
| S | D |
| D | E |
| F | F |
| G | G |
| H | A |
| J | B |
| K | C |
| L | D |
| ; | E |
| ' | F |
| ENTER | G |
| W | C#/Db |
| E | D#/Eb |
| T | F#/Gb |
| Y | G#/Ab |
| U | A#/Bb |

TABLE 1-continued

| Computer Key | Key Note |
|---|---|
| O | C#/Db |
| P | D#/Eb |
| ] | F#/Gb |

Also shown in FIG. 2 are three outer walls 325–327. When the piano-style keyboard apparatus is fit over the computer keyboard, these three outer walls border the computer keys. Wall 325 borders the left-most keys, including the tab and caps lock keys. Wall 326 borders the right-most keys, including the backspace and enter keys. Wall 327 borders the top row of the relevant keys, including the number keys and the backspace key.

Also shown in FIG. 2 are two anchors 340–341. Anchor 340 comprises a single wall which extends from wall 326 toward the center of the apparatus. When the apparatus is placed on the keyboard, anchor 340 fits between the backspace key and the enter key, thereby serving to anchor the apparatus to the keyboard. The wall comprising anchor 340 actually comprises two portions, a large upper portion (which is roughly the same height as wall 326) and a smaller lower portion. Preferably, the smaller lower portion is narrower than the larger upper portion, which allows the smaller lower portion to reach deeply into the keyboard and better secure the apparatus.

Anchor 341 is formed by two walls, 350 and 351, each of which extend from walls 325 and 327, respectively, so as to form a hollow, rectangular area. Similar to anchor 340, walls 350 and 351, each comprise a smaller lower portion and a larger upper portion. When the apparatus is placed over the computer keyboard, anchor 341 secures around the key, thereby further serving to secure the apparatus to the computer keyboard.

FIG. 3 illustrates how the anchors secure the device to the computer keyboard. Shown in FIG. 3 is a cross-section of the base of the apparatus 330, which has a base wall 326. An anchor wall 340 has a lower portion 402 and an upper portion 403. Said lower portion extends deeply in between two computer keys (410 and 411) in order to secure the apparatus to the computer keyboard. The upper portion 403 also extends in between the two computer keys, but only to the level of the top surface of the computer keyboard.

Preferably, the keyboard works with computer software which translates the various keystrokes to music. Said computer software might create the sound of a particular note played through a sound card simultaneous with the pressing of the corresponding key. As such, the computer software might permit the user to choose sounds created by a particular instrument, such as an organ, violin or trumpet. The computer software might also record the notes played for later playback or editing.

Although the present invention has been described in detail with regarding the exemplary embodiments and drawings thereof, it should be apparent to those skilled in the art that various adaptations and modifications of the present invention may be accomplished without departing from the spirit and the scope of the invention. Accordingly, the invention is not limited to the precise embodiment shown in the drawings and described in detail herein above. Therefore, it is intended that all such variations not departing from the spirit of the invention be considered as within the scope thereof as limited solely by the claims appended hereto.

What is claimed is:

1. A piano style attachment apparatus for a computer keyboard, said apparatus comprising:

a base, said base having a top and a bottom and right, center, and left base walls, each of said base walls extending downwardly from the bottom of the base;

a plurality of piano style keys hinged to said base, each said key having a top and a bottom protrusion extending downwardly from said bottom; and a first anchor extending downwardly from the bottom of said base, said first anchor comprising a first and a second anchor wall, each having a common end and a distal end, said first and second anchor walls being perpendicularly disposed with respect to each other and each extending below said base walls;

wherein said first and second anchor walls define a rectangular space such that when the piano-style attachment apparatus is placed on the computer keyboard, at least one key of the computer keyboard is received by said rectangular space, thereby securing the piano-style attachment apparatus on the computer keyboard.

2. The apparatus of claim 1 wherein said distal end of said first anchor wall is connected to said left base wall and said distal end of said second anchor wall is connected to said center base wall.

3. The apparatus of claim 1 wherein each anchor wall comprises an upper portion and a smaller lower portion wherein each upper portion is connected to the bottom of said base.

4. The apparatus of claim 3 wherein said upper portions extend downwardly from the bottom of the base substantially the same distance as do the base walls to which they are connected.

5. The apparatus of claim 3 wherein the upper portion of the first anchor wall is connected to said left base wall and the upper portion of the said second anchor wall is connected to said center base wall.

6. The apparatus of claim 1 wherein said plurality of piano-styled keys comprises diatonic piano-styled keys and chromatic piano-styled keys.

7. The apparatus of claim 6 wherein the apparatus is configured such that it fits over a standard QWERTY alpha-numeric key arrangement of a conventional computer keyboard.

8. The apparatus of claim 7 wherein the piano-styled keys of the apparatus are configured such that, when the apparatus is fit over a standard QWERTY alpha-numeric key arrangement of a conventional computer keyboard, the protrusion of each piano-styled key presses a corresponding key of the computer keyboard.

9. The apparatus of claim 8 wherein keys of the computer keyboard and piano-styled keys correspond as reflected in the following table:

| Computer Key | Key Note |
|---|---|
| A | C |
| S | D |
| D | E |
| F | F |
| G | G |
| H | A |
| J | B |
| K | C |
| L | D |
| ; | E |

-continued

| Computer Key | Key Note |
|---|---|
| ' | F |
| ENTER | G |
| W | C#/Db |
| E | D#/Eb |
| T | F#/Gb |
| Y | G#/Ab |
| U | A#/Bb |

-continued

| Computer Key | Key Note |
|---|---|
| O | C#/Db |
| P | D#/Eb |
| ] | F#/Gb |

\* \* \* \* \*